Oct. 21, 1930.   W. L. SHIRLEY ET AL   1,779,051
FLAG HOLDER
Filed July 12, 1929
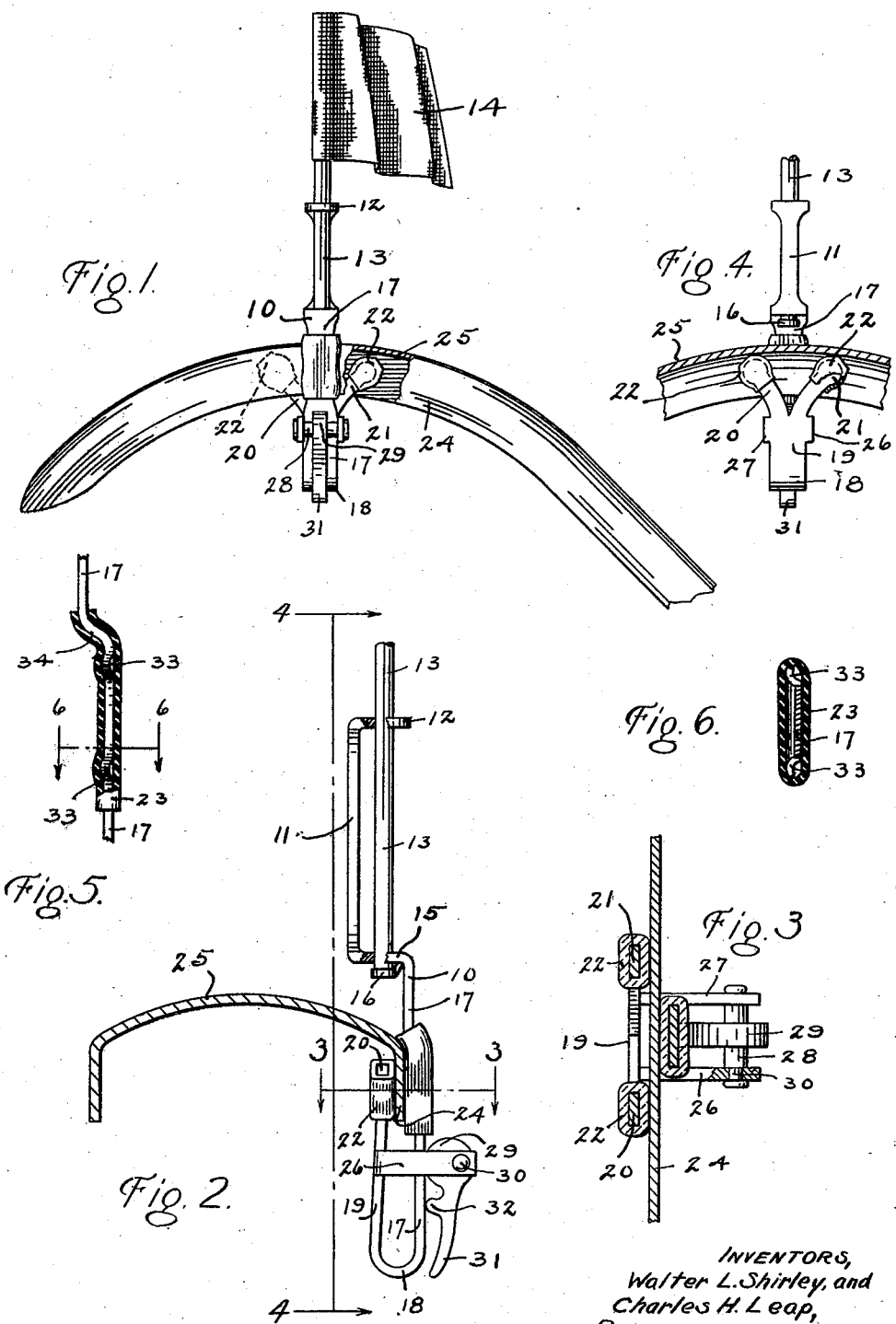
INVENTORS,
Walter L. Shirley, and
Charles H. Leap,
BY Minturn & Minturn,
Attorneys.

Patented Oct. 21, 1930

1,779,051

UNITED STATES PATENT OFFICE

WALTER L. SHIRLEY AND CHARLES H. LEAP, OF INDIANAPOLIS, INDIANA

FLAG HOLDER

Application filed July 12, 1929. Serial No. 377,830.

This invention relates to means for attaching flags or the like articles to fenders of automobiles for use to indicate cars in a procession, and has for its primary objects the provision of means for detachably receiving and holding a flag in a relatively fixed position; in providing such means with a clamping device attachable to the thin wall of a fender; in means that may be readily and cheaply manufactured to permit the use of the device in large quantities without an undue outlay of money; and in means that will not mar or scratch the automobile nor interfere with the driver's operation of the car.

These and other objects will become apparent in the following description of the invention as shown in the accompanying drawing, in which—

Fig. 1 is a fragmentary side elevation of an automobile fender to which our invention is applied;

Fig. 2, a front elevation of the flag holder;

Fig. 3, a horizontal section on the line 3—3 in Fig. 2;

Fig. 4, a vertical section on a reduced scale on the line 4—4 in Fig. 2;

Fig. 5, a detail in fragmentary front elevation of the central portion of the holder bracket on a slightly enlarged scale; and Fig. 6, a transverse section on the line 6—6 in Fig. 5.

Like characters of reference indicate like parts throughout the several views in the drawing.

From a strip of metal we stamp out a one piece bracket generally designated by the numeral 10 to have an upper vertically carried spacing arm 11 from the upper end of which is bent the plate 12 to extend horizontally therefrom and through which is punched a hole permitting the staff 13 of the flag 14 to be forced therethrough.

From the lower end of the arm 11, horizontally extends the plate 15. This plate 15 has a hole formed therethrough by punching the portion of metal 16 downwardly therefrom but not entirely separated from the plate to be carried horizontally at a slight distance thereunder, the metal coming out of the hole being that which forms the portion 16. The staff 13 has its lower end forcibly carried through the hole in the plate 15 to contact and bear against the portion 16.

From the outer end of the plate 15 the body 17 of the bracket 10 projects vertically downwardly therefrom for a distance and then is bent around rearwardly and upwardly to form the lower loop 18 and the inner upwardly projecting finger member 19. The upper end of this member 19 is bifurcated and the ends spread apart to form the two fingers 20 and 21 over the outer ends of which are slipped short lengths of rubber tubing 22. Below the plate 15 the body 17 is provided with the upper and lower fender contacting lugs 33 projecting inwardly slightly from the fender side of the body. A piece of rubber tubing 23 is slipped over the body 17 and covers the lugs to prevent scratching of the fender 25. Just above the upper pair of lugs 33, the body 17 is offset outwardly to provide the shoulder 34 as a stop means to contact the fender 25 from above to prevent the bracket from slipping vertically downward. The tubing 23 extends around the bend forming the shoulder.

The fingers 20 and 21 terminate to lie normally against the inner side of the skirt 24 and the loop 18 serves as a spring member to carry the fingers normally rearwardly from the body 17.

From the member 19 the arms 26 and 27 are bent around to pivotally receive therebetween near their outer ends the shaft 28 which is an integral part of the cam 29. The shaft 28 has reduced sections 30 formed on each of its outer ends to pass through the arms 26 and 27 whereby the cam 29 may be centrally carried between the two arms by having the shoulders at the junctions of the sections 30 with the larger diameter of the shaft 28 bent against the inner sides respectively of the arms.

The cam 29 has a lever 31 extending therefrom by which the cam may be rotated between the arms.

A stop 32 limits the rotation of the lever 31 toward the body 17 when the cam has been revolved to a point slightly beyond its maximum pressure against the body 17.

In operation, the flag carrying device is attached to the fender 25 by first raising the lever 31 to rock the cam around to permit the member 19 to travel away from the body 17 through the action of the spring loop 18. The fingers 20 and 21 may then be brought up behind the skirt 24 with the body proper 17 in front and the shoulder 34 at or above the corner of the fender, and the lever 31 is then rocked downwardly to the position as indicated in Fig. 2, whereupon the skirt 24 is compressively engaged between the fingers 20, 21, and the body lugs 34 on the body 17 through the rubbers 22 and 23 thereon.

It is to be noted that the fingers 20 and 21, when contacting the fender skirt 24, are positioned practically midway vertically between the upper and lower lugs 34, and also that the fingers are positioned horizontally beyond the planes of the vertical edges of the body 17.

While we have here shown and described the invention in the one form as now best known to us, it is obvious that many structural changes may be made therefrom without departing from the spirit of the invention, and we therefore, do not desire to be limited to that precise form any more than any be required by the following claims:

We claim:

1. In a flag holding device, an upper arm adapted to receive and support a flag, a body portion extending below said arm, an end bent around and upwardly from the lower end of said portion, and a cam adapted to be rocked to pull said end toward said portion, said end extending upwardly beyond said cam for an appreciable distance to form a gripping area opposing a like area on said body portion, both of said areas being above said cam.

2. In a flag holding device, an upper plate, a lower plate, an arm spacing and holding apart said plates, each of said plates having a hole therethrough adapted to receive the staff of a flag, a stop under said second plate limiting the insertion of said staff through the holes, a body, an end bent around and upwardly from the body, and a cam adapted to be rocked to pull said end toward said body.

3. A new article of manufacture comprising a bracket having an upper perforate plate horizontally disposed, an arm projecting downwardly from one side of the plate, a lower perforate plate projecting horizontally from the arm, a body projecting vertically downward from the lower plate, and a rear vertically disposed clamping member carried by the body, a stop extending across and below the hole in said lower plate, and a cam adapted to be rocked to draw said clamping member toward said body.

4. A new article of manufacture comprising a bracket having an upper perforate plate horizontally disposed, an arm projecting downwardly from one side of the plate, a lower perforate plate projecting horizontally from the arm, a body projecting vertically downward from the lower plate, and a rear vertically disposed clamping member carried by the body, said clamping member having its upper end bifurcated to form two spaced apart bearing fingers, said fingers having areas spaced laterally from each side of said body.

5. A new article of manufacture comprising a bracket having an upper perforate plate horizontally disposed, an arm projecting downwardly from one side of the plate, a lower perforate plate projecting horizontally from the arm, a body projecting vertically downward from the lower plate, and a rear vertically disposed clamping member carried by the body, a stop extending across and below the hole in said lower plate, and a cam adapted to be rocked to draw said clamping member toward said body, and a spring loop interconnecting the lower ends of said body and said member.

6. A new article of manufacture comprising a bracket having an upper perforate plate horizontally disposed, an arm projecting downwardly from one side of the plate, a lower perforate plate projecting horizontally from the arm, a body projecting vertically downward from the lower plate, and a rear vertically disposed clamping member carried by the body, a stop extending across and below the hole in said lower plate, and a cam adapted to be rocked to draw said clamping member toward said body, and a spring loop interconnecting the lower ends of said body and said member, and arms extending past said body, said cam being rockably supported by said arms to bear against said body.

In testimony whereof we affix our signatures.

WALTER L. SHIRLEY.
CHARLES H. LEAP.